(12) United States Patent
Blauch et al.

(10) Patent No.: US 7,185,702 B2
(45) Date of Patent: Mar. 6, 2007

(54) METHODS AND COMPOSITIONS FOR THE IN-SITU THERMAL STIMULATION OF HYDROCARBONS USING PEROXIDE-GENERATING COMPOUNDS

(75) Inventors: Matthew E. Blauch, Duncan, OK (US); Thomas D. Welton, Duncan, OK (US); Gary P. Funkhouser, Duncan, OK (US); Scott A. Berning, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 248 days.

(21) Appl. No.: 11/065,908

(22) Filed: Feb. 25, 2005

(65) Prior Publication Data

US 2006/0191686 A1    Aug. 31, 2006

(51) Int. Cl.
*E21B 43/25* (2006.01)
(52) U.S. Cl. .................. 166/300; 166/384; 166/307
(58) Field of Classification Search ...................... None
See application file for complete search history.

(56) References Cited

U.S. PATENT DOCUMENTS

| | | | | |
|---|---|---|---|---|
| 2,863,510 A | | 12/1958 | Tadema et al. ................ 166/38 |
| 3,757,861 A | * | 9/1973 | Routson ..................... 166/400 |
| 4,014,721 A | | 3/1977 | Pusch et al. ............. 149/108.6 |
| 4,057,107 A | | 11/1977 | Pusch et al. ................. 166/260 |
| 4,540,052 A | * | 9/1985 | Hitzman ..................... 166/303 |
| 4,589,488 A | * | 5/1986 | Schirmer ................... 166/257 |
| 4,867,238 A | * | 9/1989 | Bayless et al. .............. 166/261 |
| 5,669,444 A | | 9/1997 | Riese et al. |
| 6,581,684 B2 | | 6/2003 | Wellington et al. ......... 166/245 |
| 6,588,503 B2 | | 7/2003 | Karanikas et al. .......... 166/245 |
| 6,588,504 B2 | | 7/2003 | Wellington et al. ......... 166/245 |
| 6,591,906 B2 | | 7/2003 | Wellington et al. .... 166/250.01 |
| 6,591,907 B2 | | 7/2003 | Zhang et al. ............. 166/250.1 |
| 6,607,033 B2 | | 8/2003 | Wellington et al. ......... 166/245 |
| 6,609,570 B2 | | 8/2003 | Wellington et al. ......... 166/267 |
| 2002/0066565 A1 | | 6/2002 | Rouffignac et al .......... 166/302 |
| 2002/0074117 A1 | | 6/2002 | Shahin, Jr. et al. ......... 166/248 |
| 2002/0076212 A1 | | 6/2002 | Zhang et al. ................ 392/301 |
| 2002/0077515 A1 | | 6/2002 | Wellington et al. ............. 585/1 |
| 2002/0084074 A1 | | 7/2002 | de Rouffignac et al. .... 166/303 |
| 2002/0096320 A1 | | 7/2002 | Wellington et al. ......... 166/248 |
| 2002/0104654 A1 | | 8/2002 | Vinegar et al. .............. 166/267 |
| 2002/0108753 A1 | | 8/2002 | Vinegar et al. .............. 166/245 |
| 2002/0170708 A1 | | 11/2002 | Vinegar et al. ................ 166/59 |
| 2002/0191968 A1 | | 12/2002 | Vinegar et al. .............. 392/301 |
| 2002/0191969 A1 | | 12/2002 | Wellington et al. ......... 392/301 |
| 2003/0006039 A1 | | 1/2003 | Zhang et al. ................ 166/302 |
| 2003/0019626 A1 | | 1/2003 | Vinegar et al. .............. 166/261 |
| 2003/0051872 A1 | | 3/2003 | de Rouffignac et al. .... 166/248 |
| 2003/0062164 A1 | | 4/2003 | Wellington et al. ......... 166/303 |
| 2003/0066642 A1 | | 4/2003 | Wellington et al. ......... 166/245 |
| 2003/0070807 A1 | | 4/2003 | Wellington et al. ......... 166/267 |
| 2003/0075318 A1 | | 4/2003 | Keedy et al. .................. 166/60 |
| 2003/0079877 A1 | | 5/2003 | Wellington et al. ....... 166/272.1 |
| 2003/0080604 A1 | | 5/2003 | Vinegar et al. ................ 299/14 |
| 2003/0085034 A1 | | 5/2003 | Wellington et al. ......... 166/248 |
| 2003/0098149 A1 | | 5/2003 | Wellington et al. ........... 166/52 |
| 2003/0098605 A1 | | 5/2003 | Vinegar et al. ............. 166/302 |
| 2003/0100451 A1 | | 5/2003 | Messier et al. ............. 507/100 |
| 2003/0102124 A1 | | 6/2003 | Vinegar et al. ............. 166/256 |
| 2003/0102125 A1 | | 6/2003 | Wellington et al. ......... 166/266 |
| 2003/0102126 A1 | | 6/2003 | Sumnu-Dindoruk et al. ....................... 166/272.1 |
| 2003/0102130 A1 | | 6/2003 | Vinegar et al. ............. 166/302 |
| 2003/0111223 A1 | | 6/2003 | Rouffignac et al. ......... 166/256 |
| 2003/0116315 A1 | | 6/2003 | Wellington et al. ......... 166/256 |
| 2003/0130136 A1 | | 7/2003 | Rouffignac et al. ......... 507/200 |
| 2003/0131993 A1 | | 7/2003 | Zhang et al. ................ 166/256 |
| 2003/0131994 A1 | | 7/2003 | Vinegar et al. ............. 166/256 |
| 2003/0131995 A1 | | 7/2003 | de Rouffignac et al. . 166/272.1 |
| 2003/0131996 A1 | | 7/2003 | Vinegar et al. .......... 166/272.1 |
| 2003/0136558 A1 | | 7/2003 | Wellington et al. ......... 166/245 |
| 2003/0136559 A1 | | 7/2003 | Wellington et al. .... 166/250.01 |
| 2003/0137181 A1 | | 7/2003 | Wellington et al. ............ 299/5 |
| 2003/0141065 A1 | | 7/2003 | Karanikas et al. .......... 166/302 |
| 2003/0141066 A1 | | 7/2003 | Karanikas et al. .......... 166/302 |
| 2003/0141067 A1 | | 7/2003 | de Rouffignac et al. .... 166/302 |
| 2003/0141068 A1 | | 7/2003 | de Rouffignac et al. .... 166/302 |

(Continued)

OTHER PUBLICATIONS

Foreign communication related to a counter part dated May 22, 2006.

*Primary Examiner*—Frank S. Tsay
(74) *Attorney, Agent, or Firm*—Robert A. Kent; Baker Botts

(57) ABSTRACT

One embodiment provides a method for stimulating hydrocarbon production in a subterranean formation, comprising: introducing a peroxide-generating compound into a desired location in a subterranean formation, wherein the peroxide-generating compound is substantially mechanically isolated from the subterranean formation until the peroxide-generating compound reaches the desired location; and allowing the peroxide-generating compound to generate peroxide in the desired location in the subterranean formation. Another embodiment provides a method for stimulating hydrocarbon production in a subterranean formation, comprising: introducing a peroxide-generating compound into a desired location in a subterranean formation, wherein the peroxide-generating compound further comprises a chemical moderator that acts to inhibit the reaction of the hydrogen peroxide within the subterranean formation; and later, allowing the peroxide-generating compound to generate peroxide in the desired location in the subterranean formation. Another embodiment provides a treatment fluid for stimulating hydrocarbon production from a subterranean formation, comprising peroxide-generating compound and a moderator.

20 Claims, No Drawings

U.S. PATENT DOCUMENTS

| | | | |
|---|---|---|---|
| 2003/0142964 A1 | 7/2003 | Wellington et al. | 392/301 |
| 2003/0146002 A1 | 8/2003 | Vinegar et al. | 166/384 |
| 2003/0148894 A1 | 8/2003 | Vinegar et al. | 507/200 |
| 2003/0164234 A1 | 9/2003 | de Rouffignac et al. | 166/248 |
| 2003/0164238 A1 | 9/2003 | Vinegar et al. | 166/302 |
| 2003/0164239 A1 | 9/2003 | Wellington et al. | 166/302 |
| 2003/0173078 A1 | 9/2003 | Wellington et al. | 166/250.07 |
| 2003/0173080 A1 | 9/2003 | Berchenko et al. | 166/256 |
| 2003/0173081 A1 | 9/2003 | Vinegar et al. | 166/272.1 |
| 2003/0213594 A1 | 11/2003 | Wellington et al. | 166/272.1 |

* cited by examiner

METHODS AND COMPOSITIONS FOR THE IN-SITU THERMAL STIMULATION OF HYDROCARBONS USING PEROXIDE-GENERATING COMPOUNDS

BACKGROUND OF THE INVENTION

The present invention relates to subterranean hydrocarbon recovery. More particularly, the present invention relates to methods and compositions for the in-situ thermal stimulation of hydrocarbons using peroxide-generating compounds.

Non-traditional sources of hydrocarbons are playing an increasingly important role in the oil and gas industry. Such non-traditional sources include gas hydrates, heavy oil, bitumen, and coal bed methane. Gas hydrates are a common form of a unique class of chemical compounds known as clathrates, in which a rigid, open network of bonded host molecules enclose, without direct chemical bonding, appropriately sized guest molecules of another substance. In the case of gas hydrates, water acts as the host molecule, enclosing gas molecules such as methane. Recent estimates indicate that gas hydrates, and in particular methane hydrates, may contain more organic carbon than all the world's coal, oil, and non-hydrate natural gas combined; thus, making them an important potential source of energy. Heavy oil (i.e., any petroleum with an API gravity less than 28 degrees) and bitumen (e.g., asphalt and mineral wax) are also important potential energy sources, as the total heavy oil and bitumen reserves of Canada and Venezuela alone are believed to equal the light oil reserves of Saudi Arabia. Similarly, coal bed methane is also becoming an increasingly important energy source, with the total coal bed methane reverses in the United States estimated to be between 400 and 850 trillion cubic feet.

A variety of methods have been employed to facilitate the recovery of these non-traditional sources of hydrocarbons. One method of thermal stimulation common in the recovery of these non-traditional sources involves in-situ combustion wherein oxygen is injected into a reservoir and the hydrocarbons are ignited in a controlled fire, either through spontaneous combustion or by using an ignition source. The heat generated by the burning of heavy hydrocarbons produces hydrocarbon cracking, vaporization of light hydrocarbons, and the generation of water, in addition to the deposition of heavier hydrocarbons known as coke. As the fire moves, the combustion front pushes ahead a mixture of hot combustion gases, steam, and water, which in turn reduces oil viscosity and displaces oil toward production wells.

In-situ thermal stimulation has also been used to recover coal bed methane. Generally, the rate and amount of methane that can be desorbed from materials contained within the physical coal structure is highly sensitive to the in-situ temperature of the coal. The higher the in-situ temperature, the greater the quantity of total methane that can be recovered and the faster the rate at which the recovery can be achieved. Typically, coal seams considered for methane extraction are found at relatively shallow depths, where the desorption isotherm of the methane is limited by the low temperature. In-situ heating increases the desorption rate and the amount of methane recoverable from the coal seam. In-situ heating may also change the physical structure of the coal to enhance the diffusivity and permeability of the coal, allowing more efficient drainage of methane gas from the surrounding volume of coal.

One variation on such in-situ combustion involves injecting hydrogen peroxide, instead of oxygen, into the formation to stimulate the production of hydrocarbons. Inside the formation, hydrogen peroxide decomposes in a highly exothermic reaction to form water and oxygen. The oxygen released by the decomposition of the hydrogen peroxide may then react with hydrocarbons in the formation or with the formation itself, generating carbon dioxide, water, and heat that can be used to reduce oil viscosity and displace oil toward production wells, similar to the in-situ combustion methods described above.

Unfortunately, in-situ thermal stimulation methods using peroxide-generating compounds, such as hydrogen peroxide, have been hampered by the premature decomposition of the compound before it reaches the desired location within the subterranean formation. Attempts to inhibit the decomposition by manipulating the concentration or pH of the peroxide-generating compound have met with limited success and have, in fact, been known to adversely affect the formations into which the compound is injected. Furthermore, safety issues involved with the pumping of peroxide-generating compounds have also limited the widespread application and usage of such compounds in the oilfield.

SUMMARY OF THE INVENTION

The present invention relates to subterranean hydrocarbon recovery. More particularly, the present invention relates to methods and compositions for the in-situ thermal stimulation of hydrocarbons using peroxide-generating compounds.

One embodiment of the present invention provides a method for stimulating hydrocarbon production in a subterranean formation, comprising: introducing a peroxide-generating compound into a desired location in a subterranean formation, wherein the peroxide-generating compound is substantially mechanically isolated from the subterranean formation until the peroxide-generating compound reaches the desired location; and allowing the peroxide-generating compound to generate peroxide in the desired location in the subterranean formation.

Another embodiment of the present invention provides a method for stimulating hydrocarbon production in a portion of a subterranean formation, comprising: introducing a peroxide-generating compound into a desired location in a subterranean formation, wherein the peroxide-generating compound further comprises a chemical moderator that acts to inhibit the reaction of the hydrogen peroxide within the subterranean formation; and later, allowing the peroxide-generating compound to generate peroxide in the desired location in the subterranean formation.

Another embodiment of the present invention provides a treatment fluid for stimulating hydrocarbon production from a subterranean formation, comprising peroxide-generating compound and a moderator.

The features and advantages of the present invention will be readily apparent to those skilled in the art upon a reading of the description of the preferred embodiments that follows.

DESCRIPTION OF PREFERRED EMBODIMENTS

The present invention relates to subterranean hydrocarbon recovery. More particularly, the present invention relates to methods and compositions for the in-situ thermal stimulation of hydrocarbons using peroxide-generating compounds.

In accordance with the present invention, an aqueous solution of a peroxide-generating compound, such as hydrogen peroxide, may be introduced into a subterranean formation and reacted to generate heat, oxygen, and other compounds such as water that may be used in the in-situ thermal stimulation of hydrocarbons. To offset the propensity of the peroxide-generating compounds to spontaneously decompose or react before reaching a desired location in the subterranean formation, particular embodiments of the present invention inhibit or control the reaction either by mechanically isolating the peroxide-generating compound from the environment or by chemically moderating the reaction of compound, or both.

Once the peroxide-generating compound is in the desired location in the subterranean formation, the exothermic reaction of peroxide may be useful in a number of applications relating to recovery of hydrocarbons. In particular, the present invention may be useful in methane hydrates, coal bed methane recovery, and heavy oil production. For example, the decomposition of the hydrogen peroxide into oxygen and water generates a considerable amount of heat (i.e., approximately 23 Kcal/gm-mole of $H_2O_2$), and liberates oxygen that may react further with the hydrocarbons present in the subterranean formation to generate carbon dioxide and additional amounts heat and water. Depending on the concentration of the hydrogen peroxide, the water generated by the two reactions, along with the water already present in the hydrogen peroxide solution, may generate steam and/or hot water that itself may reduce the viscosity of the adjacent hydrocarbons. The viscosity of the adjacent hydrocarbons may also be reduced by the miscible solution of carbon dioxide generated by the reaction of oxygen with hydrocarbons in the formation, into hydrocarbons in the cooler regions of the reservoir. The heat generated by the various reactions may also facilitate the release of hydrocarbons from the formation. For example, in methane hydrate bearing formations, the in-situ thermal stimulation of the present invention may be used to melt methane hydrates contained within the formation material to release methane. In coal bed methane recovery, the heat released may also be used to affect the desorption isotherm of the coal bed, permanently changing the rank of the coal bed and causing the bed to release methane at a faster rate.

Generally, any peroxide or peroxide-generating compound may be used in accordance with the teachings of the present invention. One suitable peroxide-generating compound is hydrogen peroxide. Another is sodium percarbonate (or sodium carbonate peroxyhydrate), a granular product used as an alternative to perborate bleaches in household detergents that, when dissolved into water, releases $H_2O_2$ and soda ash (sodium carbonate). The pH of the resulting solution is typically alkaline, which activates the $H_2O_2$. Hydrogen peroxide may be produced using any of a number of known methods. Some known methods include steam reforming, partial oxidation under pressure, coal gasification, and electrolysis of water. The most common industrial process for production of hydrogen peroxide is the anthraquinone process. In this process substituted anthraquinones which are dissolved in a suitable organic solvent mixture are hydrogenated to form the corresponding hydroquinones. The hydroquinones are then oxidized back to quinones with oxygen (typically in the form of air), simultaneously forming hydrogen peroxide, which can be extracted with water while the quinones are returned to the hydrogenation step. Other suitable methods for making and controlling hydrogen peroxide may be found in the Kirk-Othmer Encyclopedia of Chemical Technology, Third Ed., Vol. 13 (John Wiley & Sons, New York 1980). Other suitable peroxide-generating compounds will be apparent to one skilled in the art, with the benefit of this disclosure. Typically, the peroxide-generating compound is present in the treatment fluids of the present invention in an amount in the range of from about 10% to about 90% by weight of the solution. In particular embodiments, the peroxide-generating compound may be present in the treatment fluids in an amount in the range of from about 10% to about 50% by weight of the solution.

As mentioned above, peroxide-generating compounds have a propensity to prematurely decompose spontaneously or react in the well bore environment. These reactions may be affected by many factors, including, inter alia, temperature, pH, concentration, and the presence of potential catalysts. For example, the decomposition of the peroxide-generating compound may be hastened by raising the temperature, adjusting the pH to 7.0 or greater, or introducing decomposition catalysts, such as salts of iron, nickel, cobalt, or certain other metals. Generally, the rate of decomposition increases approximately 2.2 times for each approximate 10° C. rise in temperature in the range from about 20° C. to about 100° C., and about 1.5 times for each 10° F. rise from 68° F. to 212° F. Generally, decreasing temperatures have little effect on hydrogen peroxide until they drop substantially below 0° C. Crystals do not begin to appear in 35% and 50% solutions of hydrogen peroxide until about −33° C. (−27.4° F.) and −52.2° C. (−62° F.), respectively.

Particular embodiments of the present invention may employ one or more mechanical means to minimize the decomposition of the peroxide-generating compound until the compound is down hole. Generally, the holding tanks, pumps, and the like used to handle the peroxide-generating compound prior to its injection into the subterranean formation are constructed out of passivated, corrosion-resistant materials, such as stainless steel, specifically selected to minimize the decomposition of the hydrogen peroxide. Particular embodiments of the present invention may also mechanically isolate the peroxide-generating compound from the well bore environment itself until the compound reaches a desired location in the subterranean formation. In particular embodiments, this entails injecting the peroxide-generating compound into the formation using coiled tubing constructed from a material selected for its compatibility both with the corrosive demands of the peroxide-generating compound and with the physical demands placed on coiled tubing. Such compatible coiled tubing materials include, but are not limited to, QT 16Cr alloys, such as QT 16Cr30 and QT 16Cr80, available under the tradename "NITRONIC® 30, " from Quality Tubing, Inc., of Houston, Tex. Other particular embodiments may employ other corrosion-resistant tubing, such as pure aluminum tubing, Type 304 stainless steel tubing, plastic-lined steel tubing, or tubing lined with crosslinked polyethylene (PEX), polyethylene, or some other peroxide-inert material.

Either alone or in combination with mechanical means, particular embodiments of the present invention may also use chemical means to minimize the decomposition of the peroxide-generating compound until the peroxide-generating compound reaches the desired location in the subterranean formation. Generally, these embodiments use a moderator to delay the decomposition of the peroxide-generating compound and may further use an initiator to catalyze the reaction once the peroxide-generating compound is in place in the formation.

A number of moderators are suitable in accordance with the teachings of the present invention, generally, suitable moderators are chelating or sequestering agents. While some moderators (such as stannate) are alkaline, most (such as phosphonic acids) are acidic and exhibit buffering properties which add acidity to the product. Colloidal stannate and sodium acid pyrophosphate (present from about 10 mg of moderator per liter of hydrogen peroxide to about 500 mg of moderator per liter of hydrogen peroxide) are effective moderators although organophosphonates (such as Dequest® products available from Monsanto Company of St. Louis, Mo.) are viable options. Other moderators include nitrate (aids in pH adjustment and corrosion inhibition) and phosphoric acid (aids in pH adjustment). Moreover, colloidal silicate can be used to sequester metals and thereby minimize $H_2O_2$ decomposition. One suitable moderator is sodium acid pyrophosphate. Other moderators include, but are not limited to, other phosphonates, as well as chelants, such as ethylenediaminetetraacetic acid (EDTA), which may act as moderators through, inter alia, metal ion chelation.

As used herein, "moderator" refers to any substance that can be used to intentionally control or slow the rate of reaction of the peroxide-generating compound with the formation materials. Moderators should be distinguished from "stabilizers," which are typically used to stabilize peroxide-generating compounds, such as hydrogen peroxide, from natural decomposition. In some embodiments the difference between a stabilizer and a moderator may be merely a matter of the concentration of the chosen compound. That is, at typical "stabilizing" concentrations, the compound may be inadequate for use as a moderator. However, in particular embodiments, a stabilizer may be used as a moderator in accordance with the teachings of the present invention when present at an adequate concentration.

Once the peroxide-generating compound reaches the desired location within the subterranean formation, an initiator may be used to catalyze the peroxide generation, which typically proceeds quickly once initiated. Generally, the initiator of the present invention comprises a metallic catalyst, such as iron or a metal ion, capable of catalyzing the decomposition of the peroxide-generating compound. Suitable initiators include catalysts such as iron, copper, manganese, or other transition metal compounds. Examples of suitable initiators placed into the formation include ferric chloride, copper chloride, sodium chloride, and other soluble metal ions placed in solution for the purpose of initiating the catalysis. These catalysts may also be used to speed up $H_2O_2$ reactions that may otherwise take hours or days to complete. $H_2O_2$ catalysis may occur either in solution (using soluble catalysts) or by using solid catalysts. The most commonly used solution initiator is iron, which when used with $H_2O_2$ is referred to as Fenton's Reagent. The reaction typically requires a slightly acidic pH and results in the formation of highly reactive hydroxyl radicals. In particular embodiments, the minerals naturally present in the formation itself may act as an adequate initiator. Examples of suitable minerals that act as naturally occurring initiators that may be present in the formation include, but are not limited to, iron oxides and hydroxides (e.g., magnetite, hematite, ilmenite, limonite, goethite), carbonates (e.g., siderite, ferroan calcite, ferroan dolomite, ankerite rhodochrosite, magnesite), sulfides (e.g., pyrite, phyrrhotite, chalcopyrite, galena), sheet silicates (e.g., chlorite, serpentine, illite, illite/smectite), and chain silicates (e.g., the pyroxene group). In some embodiments, the minerals naturally present in the formation itself may act as an adequate initiator. However, in situations where the minerals present in the formation are absent or not present in sufficient quantities to act as an initiator within the desired timeframe, an initiator may be added to the formation as a pre-flush or as an after-flush.

Several methods are available for determining whether the minerals present in the formation are sufficient to initiate the reaction of the peroxide-generating compound. Generally, a sample of the formation is exposed to the peroxide-generating compound. If the peroxide-generating compound is too reactive with the formation, a moderator may be added. Moderator is added until the about 95% of the peroxide-generating compound remains unconsumed after a 24-hour period. In some embodiments, this level of moderator may then be scaled up by up by about 20% to ensure an adequate amount of moderator is present to prevent the premature decomposition of the peroxide-generating compound. With the benefit of this disclosure, one skilled in the art should be able to determine the proper amount of moderator for use in chosen formation. In some embodiments of the present invention, a moderator or moderators are included in concentrations of from about 10 mg of moderator per liter of hydrogen peroxide solution to about 500 mg of moderator per liter of hydrogen peroxide solution; however, when it is desired to all but completely stop the reaction, moderator may be included in concentrations of multiple grams of moderator per liter of hydrogen peroxide solution, for example, some embodiments may use 2 grams of moderator per liter of hydrogen peroxide solution. In other embodiments of the present invention, a moderator or moderators are included in concentrations of from about 25 mg of moderator per liter of hydrogen peroxide solution to about 250 mg of moderator per liter of hydrogen peroxide solution.

After the peroxide-generating compound has been introduced into the subterranean formation, and treated with any necessary initiator, the formation is typically shut-in for a period of about 48 hours or more. This helps to ensure that the peroxide generation and any subsequent reactions with the hydrocarbons or formation have gone to completion and to allow the heat and carbon dioxide produced to diffuse in the formation. After the shut-in period, the well may be put into production. The natural formation pressure, increased pressure due to the carbon dioxide and heat, and the reduced viscosity of the hydrocarbons act to stimulate the flow of hydrocarbons from the formation into the well bore. However, after a period of production, from several days to several months, it may be desirable to repeat the treatment to maintain an economic production rate.

The teachings of the present invention may also be useful in reservoir flooding operations, typically following stimulation treatments. In the reservoir flooding procedure, a peroxide-generating compound, such as hydrogen peroxide, is continuously injected into the well to help produce additional hydrocarbons. The peroxide-generating compound in the formation decomposes to produce heated water and oxygen in a front. The oxygen then reacts with the heavy oil or residual coke in the reservoir in a combustion front to produce more heat, water, and carbon dioxide to form a front of steam, hot water, carbon dioxide, and oil. The carbon dioxide may migrate and dissolve in the cooler oil ahead of the front. The resulting low viscosity, $CO_2$-saturated oil can then flow outwardly through the resident oil toward a production well. As more carbon dioxide dissolves in the reservoir oil, a zone of continuously varying oil viscosity expands, extending from the combustion front to a zone of oil with normal reservoir properties, and resulting in the production of the oil. Additional amounts of the peroxide-generating compound injected in the formation forms an aqueous zone behind the combustion front with properties similar to water, but with a high energy potential for heating the reservoir matrix as needed. The cooler, injected peroxide-generating solution can push forward the combustion front, and also scavenge heat from the formerly heated formation (left over from the previous stimulation treatment) as it moves through the reservoir, assisting the generation of peroxide in the combustion front. In all, the hot water, steam, and carbon dioxide resulting from the reaction of the peroxide-generating compound immiscibly displaces warmer, low viscosity oil, which in turn displaces cooler, $CO_2$-saturated oil, which in turn displaces reservoir oil into a production well bore, providing an economical way to increase the hydrocarbon production of a well.

The teachings of the present invention may also be useful in a number of applications relating to recovery of hydrocarbons from non-traditional sources. In general, the teachings of the present invention may be useful in the recovery of any hydrocarbon having a viscosity that may be reduced by heating the hydrocarbon above its in-situ temperature sufficient to enable enhanced production. More particularly, the present invention may be useful in methane hydrate recovery, coal bed methane recovery, and heavy oil production. In methane hydrate extraction, the in-situ thermal stimulation of the present invention may be used to melt methane hydrates to release methane. In-situ thermal stimulation may also be used to affect the desorption isotherm in coal bed methane recovery, permanently changing the "rank" of the coal bed such that the bed releases methane at a faster rate. The in-situ thermal stimulation of the present invention may also be used to reduce the viscosity of low temperature hydrocarbons in heavy oil production.

To facilitate a better understanding of the present invention, the following examples of preferred embodiments are given. In no way should the following examples be read to limit or define the scope of the invention.

EXAMPLES

Example 1

A formation core measuring one inch in diameter by one inch in length was taken from a California Diatomite formation containing a high amount of immobile residual heavy oil and was placed in approximately 100 mL solution of 20% hydrogen peroxide. No moderator or initiator was added. The formation core material initiated peroxide decomposition naturally, thus demonstrating that the core naturally contained some initiator compounds (likely minerals and/or precipitates).

Example 2

This, example demonstrates the effect of added moderator whereby a peroxide solution is moderated when in contact with a formation sample capable of rapid natural initiation.

The following basic procedure was followed. First, 5 grams of powdered coal (<200 mesh) was wetted with 1 mL of deionized water and placed in a 20 mL HDPE reactor at 80° F. Next, 5 mL of 3% hydrogen peroxide (prepared from 50% FMC technical grade $H_2O_2$ and deionized water) containing 0.1% v/v of a non-ionic wetting surfactant (used to assure complete wetting of the hydrophobic coal particles). Finally, the evolved oxygen was collected in a gas collection tube and the volume recorded as a function of time.

Two tests were run using this procedure. The first was a control that was run using the above procedure without and added moderator. The second was run using the above procedure and also adding 0.2% w/v of sodium acid pyrophosphate moderator to the powdered coal before adding the hydrogen peroxide and surfactant.

Results of this test show that in the control test 8.8 mL of oxygen was liberated in two hours, as compared to 1.8 mL liberated in the test sample over two hours. After 5 hours, the control had liberated 12.8 mL of oxygen and the test had liberated only 5.25 mL of oxygen. After 24 hours, the control had liberated 16 mL of oxygen and the test had liberated only 12.9 mL of oxygen.

Thus, this example illustrates that the hydrogen peroxide reaction can be moderated when using hydrogen peroxide solutions capable of rapid initiation on naturally occurring formation material.

Example 3

Steel wool normally acts to initiate hydrogen peroxide decomposition. In this example, 50 mL of 3% peroxide solution containing 10 mpl NaCL was mixed with 0.1 g sodium acid pyrophosphate moderator and then 0.5 gm steel wool was added. Solutions containing the steel wool were first heated to 120° F. for 1 hour to simulate down hole conditions. The pH of the solution was about 4.4 with sodium acid pyrophosphate, 4.9 without sodium acid pyrophosphate.

After the one hour reaction period, solutions were filtered and titrated to test the level of hydrogen peroxide remaining (the amount remaining is a measure of the stability of the hydrogen peroxide solution). As seen in the data Table 1, solutions of hydrogen peroxide containing the added moderator did not show reaction to the steel wool in the one hour timeframe. By contrast, multiple control tests were run without the moderator addition. As seen, no appreciable hydrogen peroxide remained indicating complete reaction of all hydrogen peroxide after the one hour period in the control samples that did not contain added moderator.

TABLE 1

| Blend | | % $H_2O_2$ decomposition |
|---|---|---|
| Blank | 50 mL $H_2O_2$ | 3 |
| Control #1 | 50 mL $H_2O_2$, 0.5 g steel wool, 10 ppm NaCl | 100 |
| Control #2 | 50 mL $H_2O_2$, 0.5 g steel wool, 10 ppm NaCl | 99 |
| Control #3 | 50 mL $H_2O_2$, 0.5 g steel wool, 10 ppm NaCl | 99 |
| Control #4 | 50 mL $H_2O_2$, 0.5 g steel wool, 10 ppm NaCl | 100 |
| Test #1 | 50 mL $H_2O_2$, 0.5 g steel wool, 10 ppm NaCl along with 0.1 g sodium acid pyrophosphate moderator | 1 |
| Test #2 | 50 mL $H_2O_2$, 0.5 g steel wool, 10 ppm NaCl along with 0.1 g sodium acid pyrophosphate moderator | 2 |

Thus, this example demonstrated the ability of a sodium acid pyrophosphate to act as a moderator in the presence of an otherwise rapidly initiating substance.

Example 4

An example of the suitability of QT 16Cr80 coiled tubing used for down hole delivery of hydrogen peroxide is illustrated.

In this example, standard solutions of hydrogen peroxide are prepared and were titrated to test the level of hydrogen peroxide remaining after being exposed to a "coupon" sample of QT 16Cr80. The tests were run over a period of about 48 hours. The difference between the solution in contact with the coupon versus the control solution is a measure of the stability of the hydrogen peroxide in contact with the coupon.

For each tested peroxide concentration (5%, 10%, and 35%) 100 mL of commercial grade hydrogen peroxide was placed in a beaker along with a coupon. Each beaker was tested at intervals along with a blank sample (containing no coupon).

TABLE 2

5% Hydrogen Peroxide.

| | % $H_2O_2$ | |
|---|---|---|
| Interval (hr) | blank | With coupon |
| 24 | 6.8 | 6.7 |

TABLE 3

10% Hydrogen Peroxide.

| | % $H_2O_2$ | |
|---|---|---|
| Interval (hr) | blank | With coupon |
| 1 | 9.5 | 11.7 |
| 24 | 9.6 | 11.8 |
| 48 | 9.9 | 11.8 |

TABLE 4

35% Hydrogen Peroxide.

| | % $H_2O_2$ | |
|---|---|---|
| Interval (hr) | blank | With coupon |
| 3 | 33.9 | 31.9 |
| 24 | 34.2 | 33.9 |
| 48 | 32.9 | 33.8 |

As evident in Tables 2 through 4, the rate of decomposition for the test samples exposed to the coupons was within the experimental error of blank solutions. Thus, this example illustrates that all three different concentrations of hydrogen peroxide tested were stable when in contact with the QT 16Cr80 coiled tubing coupons.

Example 5

This example demonstrates the effect of added initiator in a formation core that does not contain sufficient natural initiator.

In this example, 30 mL of 35% hydrogen peroxide was added to a 100 mL beaker along with core sample weighing approximately 10 g. The core sample consisted of a clean quartz arenite formation containing natural hydrocarbons but lacking any significant quantity of natural formation mineral initiators. The sample was approximately 70° F. Ten minutes after the hydrogen peroxide had been added, very little heat had been generated, and the temperature in the beaker had risen to only about 150° F. Next, 2 mL of 10% iron chloride (an initiator) was added and the temperature rapidly (within 15 minutes) rose to (and likely exceeded) the maximum measuring ability of the thermometer (220° F.).

Thus, this example illustrates that a hydrogen peroxide initiator can be used to enhance the temperature raising abilities of hydrogen peroxide in formations having insufficient natural initiators.

Example 6

To demonstrate the ability of a moderator to inhibit a reaction in progress, 30 mL of 35% hydrogen peroxide was added to a 100 mL beaker along with core sample weighing approximately 10 g. A 70° F. core sample consisted of a clean quartz arenite formation lacking any significant quantity of natural formation mineral initiators. After 10 minutes, very little heat had been generated, the temperature in the beaker had risen to only about 150° F. Next, 2 mL of 10% iron chloride (an initiator) was added and the temperature rapidly (within 15 minutes) rose to (and likely exceeded) the maximum measuring ability of the thermometer (220° F.). Next, 2 grams of sodium acid pyrophosphate (a moderator) was added and the temperature rapidly dropped to about 140° F.

Thus, this example shows that an appropriate moderator can be chosen to essentially stop the release of heat or to moderate the level of release.

Example 7

Initially, 30 mL of 35% hydrogen peroxide and 1 gram of pyrophosphoric acid disodium salt (a moderator) were added to a 100 mL beaker, the mixture in the beaker was about 70° F. Next, 12 mL of 10% iron chloride solution was added to the mixture and the temperature rapidly (in less than a minute) rose to (and likely exceeded) the maximum measuring ability of the thermometer (220° F.). Next, another 1 gram of sodium acid pyrophosphate was added to the mixture and the temperature rapidly fell to about 90° F. and visual inspection of the mixture showed that bubbling had stopped. Finally, another 10 mL of 10% iron chloride solution was added to the mixture and the temperature again began to rise and exceeded the maximum measuring ability of the thermometer (220° F.). This example demonstrates the ability to turn on and off the exothermic abilities of hydrogen peroxide.

Therefore, the present invention is well adapted to attain the ends and advantages mentioned as well as those that are inherent therein. While numerous changes may be made by those skilled in the art, such changes are encompassed within the spirit of this invention as defined by the appended claims.

What is claimed is:

1. A method for stimulating hydrocarbon production in a portion of a subterranean formation, comprising:
   introducing a peroxide-generating compound into a desired location in a subterranean formation, wherein the peroxide-generating compound is substantially mechanically isolated from the subterranean formation until the peroxide-generating compound reaches the desired location; and
   allowing the peroxide-generating compound to generate peroxide in the desired location in the subterranean formation.

2. The method of claim 1 wherein the peroxide-generating compound mechanically isolated using a method comprising introducing the peroxide-generating compound into a desired location in a subterranean formation using corrosion-resistant coiled tubing.

3. The method of claim 1 further comprising chemically inhibiting the reaction of the peroxide-generating compound through the use of a moderator.

4. The method of claim 3 wherein the moderator comprises at least one of the following: a sodium acid pyrophosphate, pyrophosphate, a phosphonate, ethylenediaminetetraacetic acid, or a chelant and wherein the moderator is present in an amount in the range of from about 10 mg of moderator per liter of hydrogen peroxide to about 2 g per liter of hydrogen peroxide.

5. The method of claim 1 further comprising, during the step of allowing the peroxide-generating compound to generate peroxide in the desired location in the subterranean formation, catalyzing the reaction of the peroxide-generating compound with an initiator wherein the initiator comprises a metallic compound.

6. The treatment fluid of claim 5 wherein the initiator comprises an iron oxide, iron hydroxide, carbonate, sulfide, sheet silicate, or chain silicate.

7. The method of claim 5 wherein the initiator is introduced into the subterranean formation as either a pre-flush before introducing a peroxide-generating compound into a desired location in a subterranean formation or as an after-flush after introducing a peroxide-generating compound into a desired location in a subterranean formation.

8. A method for stimulating hydrocarbon production in a portion of a subterranean formation, comprising:
   introducing a peroxide-generating compound into a desired location in a subterranean formation, wherein the peroxide-generating compound further comprises a chemical moderator that acts to inhibit the reaction of the hydrogen peroxide within the subterranean formation; and later,
   allowing the peroxide-generating compound to generate peroxide in the desired location in the subterranean formation.

9. The method of claim 8 wherein the peroxide-generating compound mechanically isolated using a method comprising introducing the peroxide-generating compound into a desired location in a subterranean formation using corrosion-resistant coiled tubing.

10. The method of claim 8 further comprising chemically inhibiting the reaction of the peroxide-generating compound through the use of a moderator.

11. The method of claim 10 wherein the moderator comprises at least one of the following: sodium acid pyrophosphate, a pyrophosphonate, a phosphonate, ethylenediaminetetraacetic acid, or a chelant and wherein the moderator is present in an amount in the range of from about 10 mg of moderator per liter of hydrogen peroxide to about 2 g per liter of hydrogen peroxide.

12. The method of claim 8 further comprising, during the step of allowing the peroxide-generating compound to generate peroxide in the desired location in the subterranean formation, catalyzing the reaction of the peroxide-generating compound with an initiator wherein the initiator comprises a metallic compound.

13. The treatment fluid of claim 12 wherein the initiator comprises an iron oxide, iron hydroxide, carbonate, sulfide, sheet silicate, or chain silicate.

14. The method of claim 12 wherein the initiator is introduced into the subterranean formation as either a pre-flush before introducing a peroxide-generating compound into a desired location in a subterranean formation or as an after-flush after introducing a peroxide-generating compound into a desired location in a subterranean formation.

15. A treatment fluid for stimulating hydrocarbon production from a portion of a subterranean formation, comprising peroxide-generating compound and a moderator.

16. The treatment fluid of claim 15 wherein the moderator comprises at least one of the following: sodium acid pyrophosphate, a pyrophosphonate, a phosphonate, ethylenediaminetetraacetic acid, or a chelant.

17. The treatment fluid of claim 15 wherein the moderator is present in an amount in the range of from about 10 mg of moderator per liter of hydrogen peroxide to about 2 g per liter of hydrogen peroxide.

18. The treatment fluid of claim 15 wherein the peroxide-generating compound comprises at least one of the following: hydrogen peroxide or sodium percarbonate.

19. The treatment fluid of claim 15 further comprising an initiator and wherein the initiator comprises a metallic compound.

20. The treatment fluid of claim 15 wherein the initiator comprises an iron oxide, iron hydroxide, carbonate, sulfide, sheet silicate, or chain silicate.

* * * * *